United States Patent

[11] 3,618,725

| [72] | Inventors | Walter J. Penkal, Jr.<br>Parma Heights;<br>Kirit R. Patel, Cleveland, both of Ohio |
|---|---|---|
| [21] | Appl. No. | 875,871 |
| [22] | Filed | Nov. 12, 1969 |
| [45] | Patented | Nov. 9, 1971 |
| [73] | Assignee | Eaton Yale & Towne Inc.<br>Cleveland, Ohio |

[54] TORQUE-TRANSMITTING ASSEMBLY
12 Claims, 6 Drawing Figs.

[52] U.S. Cl. .................................................. 192/55,
188/73.5, 188/163, 188/250 E, 192/84 A, 192/109 B

[51] Int. Cl. .................................................. F16d 3/14,
F16d 27/06

[50] Field of Search .................................. 192/55,
109, 109 B, 70.17, 70.18, 84, 84 A, 84 C;
188/73.5, 163, 164, 218 A, 250 E

[56] References Cited
UNITED STATES PATENTS

| 1,842,039 | 1/1932 | Matthews | 192/55 |
| 2,143,300 | 1/1939 | Cole | 192/70.17 |
| 2,850,124 | 9/1958 | Grote | 192/109 A X |
| 3,198,302 | 8/1965 | Janzen | 192/55 X |
| 3,205,989 | 9/1965 | Mantey | 192/55 X |
| 3,245,508 | 4/1966 | Livezey | 192/70.17 |

Primary Examiner—Allan D. Herrmann
Attorney—Yount and Tarolli

ABSTRACT: A torque-transmitting assembly includes a pair of torque-transmitting members which are movable between an engaged torque-transmitting position and a disengaged position. Upon energization of an electrical coil, the members are moved into the torque-transmitting position. One of the torque-transmitting members is carried by a base and supported thereon for limited rotational movement relative thereto. During the relatively low pressure initial engagement between the torque-transmitting members, the one member rotates relative to the base to minimize slippage between the torque-transmitting members.

INVENTORS
WALTER J. PENKAL JR.
KIRIT R. PATEL
BY *Yount and Tarolli*
ATTORNEYS

INVENTORS
WALTER J. PENKAL JR.
KIRIT R. PATEL
BY Young and Tarolli
ATTORNEYS

TORQUE-TRANSMITTING ASSEMBLY

This invention relates generally to a torque-transmitting assembly and more particularly to a torque-transmitting assembly wherein a pair of torque-transmitting members are movable between a disengaged position and an engaged position to transmit torque therebetween.

A known torque-transmitting assembly includes a pair of torque-transmitting members which are movable between an engaged position and a disengaged position upon the energization of an electrical coil. When the electrical coil is energized, the torque-transmitting members initially engage with a slight pressure and then achieve a high-pressure engagement, this, of course, occurs over an extremely short time interval. However, during the initial engagement at the beginning of the time interval when only a slight pressure engagement exists, a rubbing or sliding of one of the torque-transmitting members relative to the other occurs. This relative sliding also occurs during disengagement when the relatively low-pressure relationship again is experienced. The above-noted relative sliding results in vibration and noise, and a loud characteristic squeek can be detected every time the torque transmitting members are engaged or disengaged. This noise and vibration is quite objectionable.

It has been discovered that the above vibration and noise can be reduced below the audible range or level by allowing the torque-transmitting members to move together when in a relatively slight pressure engagement. This can be achieved by allowing one of the torque-transmitting members to float within a supporting base so that it can have limited movement relative to the base. As a result, rather than relative sliding movement of the torque-transmitting members occuring, as in the prior art, the torque-transmitting members move together relative to the base. Thus, the noise is reduced to a level below the audible range. Accordingly, the principal object of the present invention is the provision of a new and improved torque-transmitting assembly having a pair of torque-transmitting members which are moved between an engaged and disengaged position upon energization of an electrical coil and wherein relative sliding of the members during engagement and disengagement is minimized to minimize noise resulting therefrom.

Another object of the present invention is the provision of a new and improved torque-transmitting assembly having a pair of torque-transmitting members which are movable into engagement and disengagement and wherein one of the members is supported by a base for limited movement relative thereto so that the torque-transmitting members move together relative to the base as opposed to one torque transmitting member sliding relative to the other.

Another object of this invention is to provide a new and improved torque-transmitting assembly, as noted above, including a torque-transmitting disk assembly having a plurality of outwardly projecting pin elements which are received in comparatively large openings in a base to enable the disk assembly to rotate relative to the base when the torque-transmitting disk assembly is engaged by another torque-transmitting member.

Another object of this invention is to provide a new and improved torque-transmitting assembly in accordance with the next preceding paragraph wherein elastomeric material is disposed in the openings between the pin elements and the base and bias the pin elements to their normal positions.

These and other objects and features of the present invention will become more apparent upon a consideration of the following description taken in connection with the accompanying drawings wherein.

Figure 1:
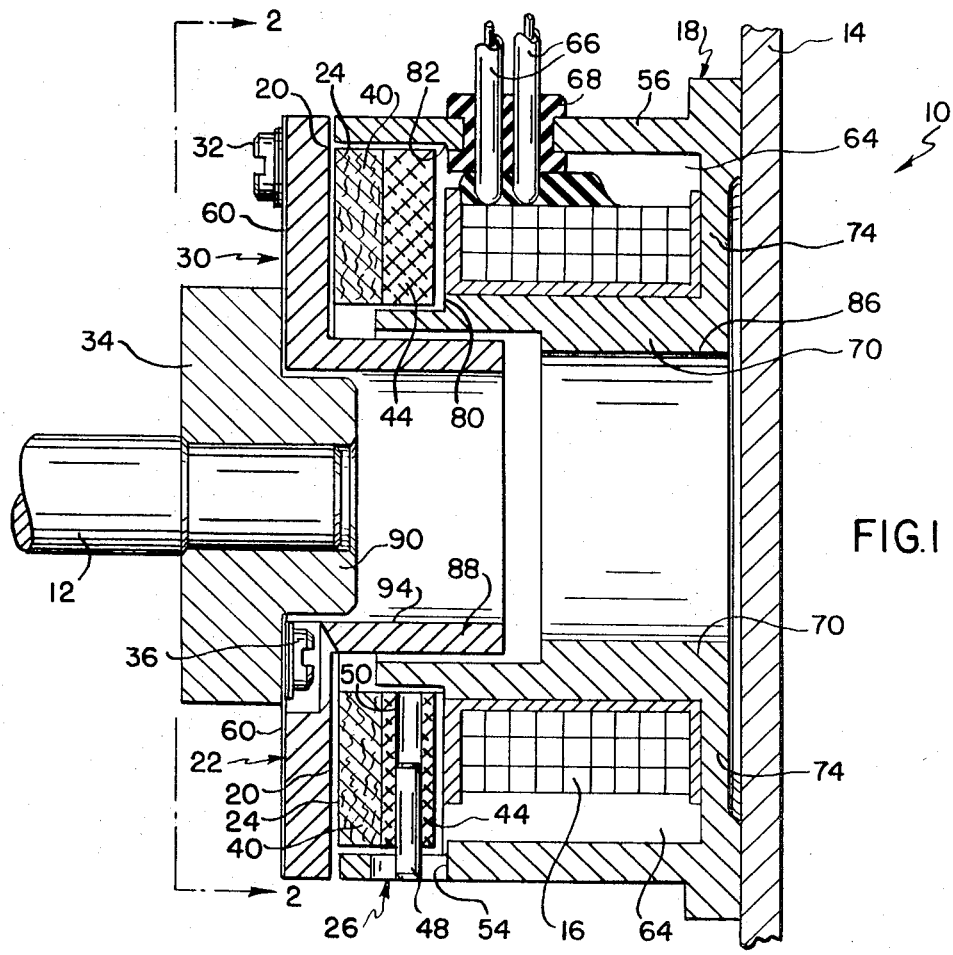
FIG. 1 is a sectional view of a torque-transmitting assembly constructed in accordance with the present invention.

The present invention relates to a torque-transmitting assembly which includes a pair of torque-transmitting members which have a disengaged position and an engaged position. The torque transmitting assembly of the present invention is constructed so as to minimize relative sliding of the torque-transmitting members during engagement and disengagement and the vibration and noise created thereby. A torque-transmitting assembly of the present invention may be of various constructions and uses. In particular, a torque-transmitting assembly of the present invention may be used as either a clutch or brake. As representative of the present invention, a torque-transmitting assembly 10 is illustrated in the drawings and comprises a brake.

The torque-transmitting assembly 10, as noted above, functions as a brake and when energized retards rotation of a shaft or member 12 relative to a fixed member 14. The torque-transmitting assembly includes a pair of torque-transmitting members 22, 26. The torque-transmitting member 22 comprises a drive plate drivingly connected with the shaft 12. The torque-transmitting member 26 comprises a friction disk assembly 26 carried by a housing or base 18. The housing or base 18 is fixedly secured to the member 14. Upon energization of an electrical coil 16 mounted on the housing or base 18, a torque-transmitting surface 20 of the drive plate 22 is moved into frictional engagement with a torque-transmitting surface 24 on the friction disk assembly 26. Frictional engagement between the torque-transmitting surfaces 20 and 24 under the influence of the electrical coil 16 results in the drive plate 22 being held against rotation relative to the housing 18 to thereby brake rotation of the shaft or member 12 relative to the fixed member 14.

Figure 2:
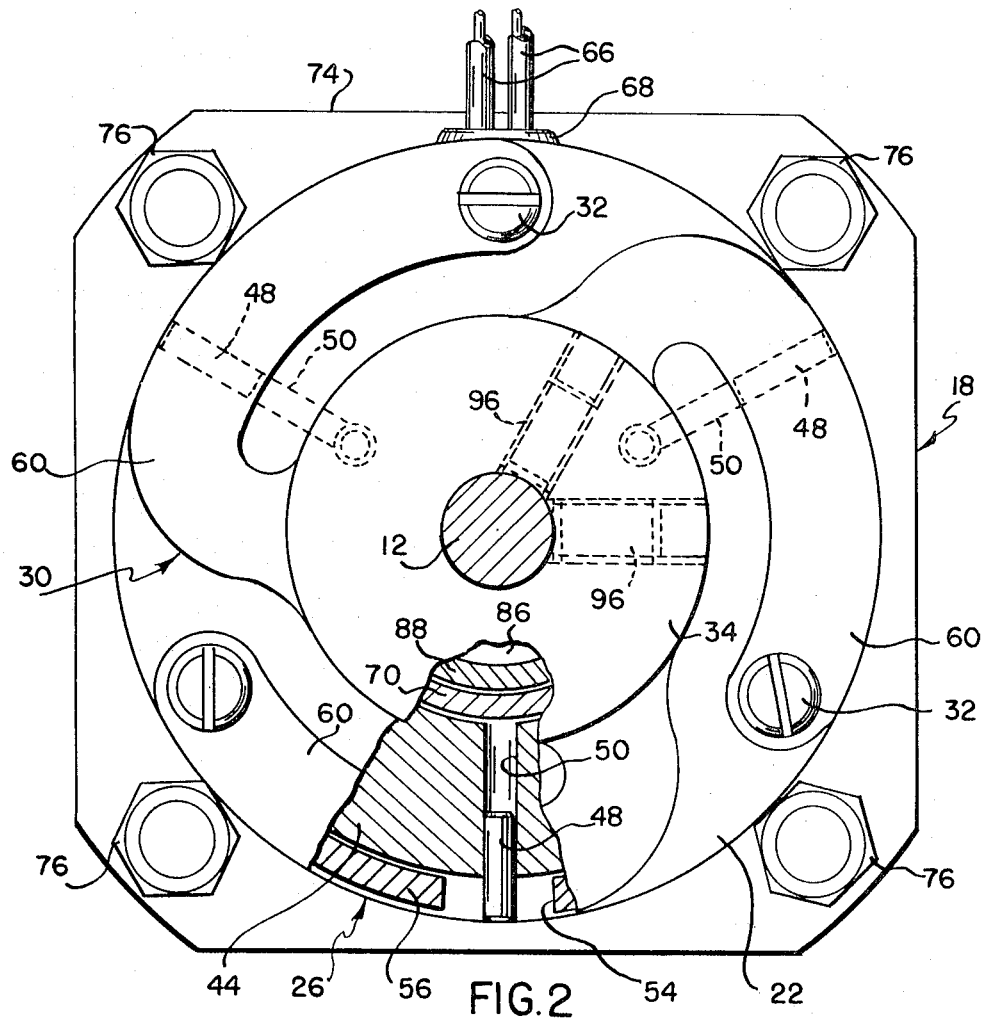
FIG. 2 is a partially broken away sectional view, taken generally along the line 2-2 of FIG. 1.

Upon energization of the electrical coil 16, the drive plate 22 is moved axially inwardly against the influence of a spring 30 which is connected to the drive plate 22 by fasteners 32 and to a hub 34 on the shaft 12 by fasteners 36 (see FIGS. 1 and 2). Inward movement of the drive plate 22 under the influence of a magnetic field emanating from the energized electrical coil 16 causes the friction surface 20 to engage the friction surface 24 with a relatively low initial pressure. This relatively low initial pressure quickly increases to a relatively high final or torque-transmitting pressure as a drive plate 22 is urged or pressed against the friction disk assembly 26 under the influence of the energized coil 16.

The initial engagement between the torque-transmitting surfaces 20 and 24 is at a relatively low pressure which is insufficient to prevent the surface 20 from slipping relative to the surface 24 under the influence of a load applied to the drive plate 22 by the shaft 12. If slipping and/or rubbing was allowed to occur between the surfaces 20 and 24, a characteristic squeak or squealing noise would result from the dissipation of energy in the form of vibrations. Of course, the pressure between the surfaces 20 and 24 would quickly increase to a pressure which is sufficient to prevent slippage between the surfaces 20 and 24.

In accordance with the present invention, the natural frequency of vibration of the assembly 10 is reduced below the audible range or level and slipping between the surfaces 20 and 24 is minimized to eliminate or at least reduce noise upon initial engagement between the surfaces 20 and 24. This is accomplished by allowing the friction disk assembly 26 to rotate with the drive plate 22 during the relatively low pressure initial engagement between the torque-transmitting surfaces 20 and 24 Thus during the low pressure initial engagement between the surfaces 20 and 24, the surface 24 is free to rotate with the surface 20. After the pressure between the surfaces 20 and 24 has increased due to the influence of the magnetic field emanating from the energized coil 16, movement of the friction disk assembly 26 and the surface 14 relative to the housing 18 is stopped to thereby brake rotation of the shaft 12.

Figure 3:
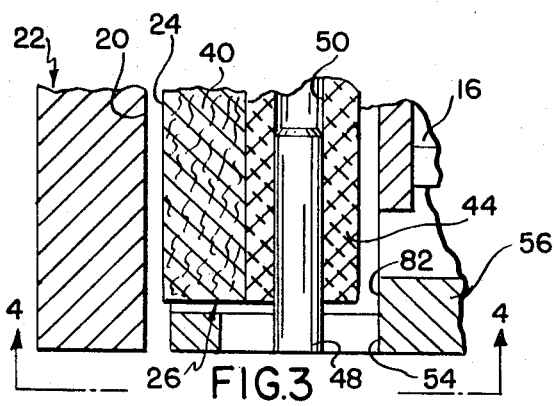
FIG. 3 is an enlarged fragmentary sectional view of the assembly of FIG. 1.

The friction disk assembly 26 includes an annular friction lining or disk 40 formed of a suitable material such as asbestos or a cork substitute. The friction lining 40 is bonded, in a known manner, to a backing or baseplate 44 made of a nonmagnetic metal such as aluminum. A plurality of pins 48 are fixedly secured in radially extending holes 50 in the backing plate 44 (see FIGS. 1 and 2). The pins 48 extend outwardly into holes or openings 54 in a cylindrical outer wall 56 of the housing 18 (see FIGS. 3 and 4). The openings 54 have a substantially larger diameter than the pins 48 to enable relative movement to occur between the pins and the housing 18.

Figure 4:
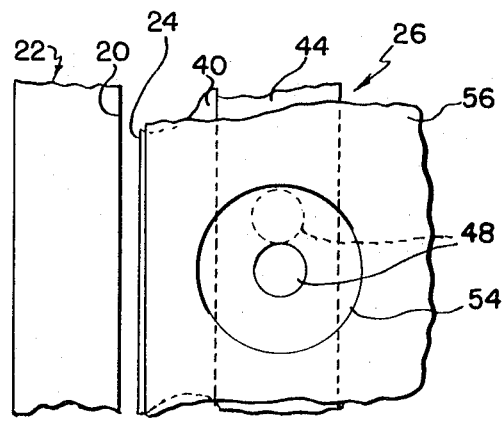
FIG. 4 is an enlarged fragmentary view, taken generally along the line 4-4 of FIG. 3.

Upon initial engagement between the torque-transmitting surfaces 20 and 24, the drive plate 22 rotates the friction disk assembly 26 until the pins 48 engage the sides of the holes or openings 54, that is until the pins are moved to the position indicated in dashed lines in FIG. 4. During the time required for the pins 48 to move into engagement with the sides of the openings 54, the pressure applied by the surface 20 on the drive plate 22 against the surface 24 on the friction disk assembly 26 increases under the influence of the magnetic field emanating from the energized coil 16. Therefore, when the pins 48 engage the sides of the openings 54, the friction force between the surfaces 20 and 24 is sufficient to prevent, or at least minimize, slipping movement between the surfaces 20 and 24.

when the pins 48 are brought into engagement with the sides of the openings 54 (see the dashed line position of FIG. 4), arms 60 of the springs 30 (see FIG. 2) are flexed somewhat to enable the shaft 12 and hub 34 to rotate slightly relative to the housing 18 in the direction of rotation of the shaft 12. When the electrical coil 16 is deenergized, the previous flexing of the spring arms 60 is releases or eliminated with a slight reverse rotation of the drive plate 22 and friction disk assembly 26 relative to the housing 18 as the pressure between the torque-transmitting surfaces 20 and 24 is decreased. This slight reverse rotation is sufficient to center the pins 48 in the openings 54 until subsequent operation of the assembly 10.

The electrical coil 16 is fixedly mounted within an annular chamber 64 in the housing 18 (see FIG. 1). Wires or leads 66 extend through a grommet 68 in an opening in the wall 56 to connect the coil 16 with a suitable source of power. The chamber 64 is formed between the cylindrical outer wall 56 of the housing 18 and a cylindrical inner wall 70 of the housing. The cylindrical walls 56 and 70 of the housing 18 are interconnected by an annular end wall 74 which is secured to the member 14 by suitable fasteners 76 (see FIG. 2). This construction of the housing 18 provides the chamber 68 with an annular open end portion for receiving the friction disk assembly 26. It should be noted that the inner and outer walls 56 and 70 of the housing are cut away to provide shoulders 80 and 82 against which the baseplate 44 is pressed by the drive plate 22 upon energization of the coil 16.

This construction provides the housing 18 with a cylindrical opening 86 (FIG. 1) which, depending upon the environment in which the assembly 10 is to be used, enables the assembly to be readily mounted on a shaft or similar member. The drive plate 22 includes a guide sleeve 88 which is received in the opening 86 to guide movement of the drive plate 22 in an axial direction relative to the housing 18 under the influence of the electrical coil 16. In addition, the hub 34 has an axially projecting guide portion 90 which is received in an opening 94 formed by the annular sleeve 88 to guide movement of the drive plate 22 relative to the hub. The hub 34 is fixedly connected to the shaft 12 by setscrews 96 (FIG. 2).

In the embodiment of the invention illustrated in FIGS. 1 through 4, the pin elements 48 are freely movable within the openings 54. In the embodiment of the invention illustrated in FIG. 5, a resilient body of elastomeric material is provided in the holes or openings to return the pin elements to their normal positions after each operation of the assembly 10. Since the embodiment of the invention illustrated in FIG. 5 includes components similar to those in the embodiment of the invention illustrated in FIGS. 1 through 4, similar numerals will be utilized to designate the components of the embodiment of the invention illustrated in FIG. 5, the suffix letter "a" being added to the numerals of FIG. 5 to avoid confusion.

A friction disk assembly 26a (FIG. 5) includes a friction lining 40a which is secured to a backing plate 44a. A plurality of radially outwardly projecting pin elements 48a are secured to the backing plate 44a in the manner previously described in connection with the embodiment of the invention illustrated in FIGS. 1 through 4. The pin elements 48a extend into openings 54a formed in a sidewall 56a of a housing 18a.

Figure 5:
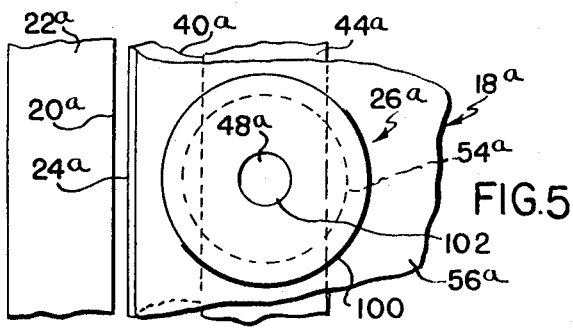
FIG. 5 is a fragmentary view, generally similar to FIG. 4, illustrating another embodiment of the invention.

In accordance with the embodiment of the invention illustrated in FIG. 5, a grommet 100 of a suitable elastomeric material is mounted on the outer wall 56a of the housing 18a and extends through the opening 54a. The grommet 100 includes a central opening 102 through which the pin 48a projects. Upon operation of the friction disk assembly 26a, a pin 48a is moved toward the side of the opening 54a in the manner previously described in connection with the embodiment of FIGS. 1 through 4. When the friction disk assembly is released, the natural resilience of the grommet 100 returns the pin element 48a to its initial or normal position (illustrated in FIG. 5). In addition to returning the pin 48a to its normal position, the grommet 100 prevents a buildup of dust from hindering movement of the friction disk assembly 26a relative to the housing 18a.

Figure 6:
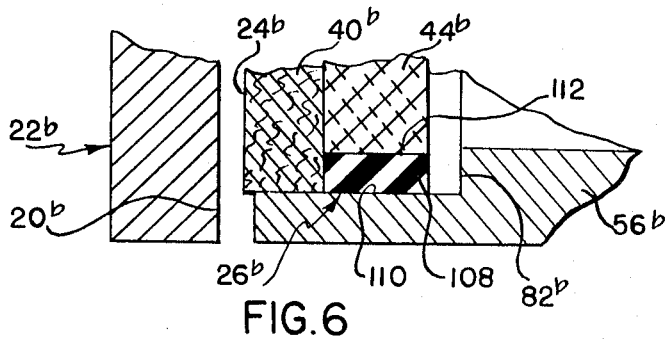
FIG. 6 is a fragmentary sectional view of still another embodiment of the invention.

The embodiment of the invention illustrated in FIG. 6 is generally similar to the embodiment illustrated in FIG. 5. However, in the embodiment of FIG. 6, the pin elements have been eliminated and the friction disk assembly is returned to its initial or normal position by a body of elastomeric material which is bonded to the friction disk assembly and the housing. Since the embodiment of the invention illustrated in FIG. 6 is generally similar to the embodiments of the invention illustrated in FIGS. 1 through 5, similar numerals will be utilized to designate similar components, the suffix letter "b" will be utilized in connection with the components of FIG. 6 to avoid confusion.

In the embodiment of the invention illustrated in FIG. 6, an annular body 108 of elastomeric material is bonded at 110 to the outer wall 56b of the housing 18b and is bonded at 112 to the backing plate 44b. The annular bonds 110 and 112 secure the friction disk assembly 26b to the housing 18b while enabling the friction disk assembly to move relative to the housing by a resilient yielding of the annular body 108 of elastomeric material. Thus, upon energization of a coil associated with the friction disk assembly 26b, the friction disk assembly 26b is rotated slightly relative to the housing 18b under the influence of the drive plate 22b during the initial, low pressure, engagement between the torque-transmitting surfaces 20b and 24b. When the coil is deenergized, the natural resilience of the body 108 of elastomeric material causes the friction disk assembly 26b to assume its normal or initial position.

In view of the foregoing remarks, it can be seen that the torque-transmitting assembly 10 includes a friction disk assembly 26 which is movable relative to the housing 18 upon initial operation of the assembly to an engaged condition. This movement of the torque-transmitting assembly 26 relative to the housing 18 minimizes slippage between the torque-transmitting surfaces 20 and 24 to thereby minimize objectionable noise by effectively dampening vibration of the friction disk assembly. In the embodiment of the invention illustrated in FIG. 1, movement of the friction disk assembly 26 relative to the housing 18 is provided for by radially projecting pin elements 48 which extend into openings 54 having a larger area than the cross-sectional area of the pin elements 48. In the embodiment of the invention illustrated in FIG. 5, a body 100 of the elastomeric material is provided to return the pin elements to their normal or initial position. Although the elastomeric material takes the form of a grommet in the embodiment of FIG. 5, it should be understood that the elastomeric material could be molded in the opening 54a. The embodiment of the invention illustrated in FIG. 6 relies upon the yieldability of an annular body 108 of elastomeric material to provide for the movement of the friction disk assembly relative to the housing 18b.

Having described several specific embodiments of the invention, the following is claimed:

1. An assembly for transmitting torque between a pair of members, said assembly comprising a housing including one of said pair of members, a pair of torque-transmitting members operable between a disengaged condition and an engaged condition in which relative rotation between the pair of members is retarded by frictional engagement between torque-transmitting surfaces of said torque-transmitting members, electrical coil means supported in said housing for effecting operation of said torque-transmitting members from the disengaged condition to the engaged condition in such manner that the pressure between said torque-transmitting surfaces increases from a relatively low initial pressure to a final torque transmitting pressure, and means for supporting one of said torque-transmitting members in said housing for rotational movement with the other torque-transmitting member relative to said housing during the initial engagement between said torque-transmitting surfaces to minimize slippage between said torque-transmitting members during the relatively low initial pressure engagement between said torque-transmitting members.

2. An assembly as set forth in claim 1 wherein said means operatively interconnecting said one torque-transmitting member and said housing includes a plurality of pin elements extending through openings formed in said housing, said openings having a greater cross-sectional dimension than said pin elements.

3. An assembly as set forth in claim 2 further including resilient means encircling said pin elements and located within said openings for yieldably resisting movement of said pin elements relative to said housing.

4. An assembly as set forth in claim 1 wherein said means operatively interconnecting said one torque transmitting member and said housing includes a body of elastomeric material connected to said torque-transmitting member and said housing for yieldably retaining said one torque-transmitting member against movement relative to said housing.

5. An assembly for transmitting torque between a pair of members, said assembly comprising a pair of torque-transmitting members operable between a disengaged condition and an engaged condition in which relative rotation between said members is retarded by frictional engagement between torque-transmitting surfaces of said torque-transmitting members, one of said torque-transmitting members comprising friction disk means, said friction disk means including a plurality of radially projecting pin elements, base means adapted to be connected to one of said pair members and having a plurality of openings for receiving said pin elements to operatively interconnect said base means and said friction disk means, each of said openings in said base means having a larger cross-sectional area than an associated one to said pin elements to enable said friction disk means to rotate relative to said base means upon operation of said torque-transmitting members to the engaged condition to thereby tend to minimize slippage upon initial engagement of said torque-transmitting members, and means for operating said torque-transmitting members between the disengaged and engaged conditions.

6. An assembly as set forth in claim 5 wherein said friction disk means includes a friction member having one of said torque-transmitting surfaces and a backing plate connected to said friction member, said pin elements extending radially outwardly from said backing plate.

7. An assembly as set forth in claim 6 further including a hub element adapted to be fixedly connected to the other of said pair of members, the other of said torque-transmitting members being mounted adjacent said hub element, and spring means operatively interconnecting said hub element and said other torque-transmitting member for enabling said other torque-transmitting member to move axially of said hub element, said means for operating said torque-transmitting members between the engaged and disengaged conditions including means for moving said other torque-transmitting member relative to said hub element against the influence of said spring means.

8. An assembly as set forth in claim 7 wherein said means for moving said other torque-transmitting member relative to said hub element includes electromagnetic means mounted on said base means, said electromagnetic means being energizable to magnetically attract said other torque-transmitting member to thereby press said torque-transmitting surfaces together.

9. An assembly as set forth in claim 5 further including a plurality of bodies of elastomeric material, each of said bodies of elastomeric material being disposed in one of the openings in said base means and extending around an associated one of said pin elements to cushion movement of the associated pin element relative to said base means.

10. An assembly for transmitting torque between a pair of members, said assembly comprising a pair of torque-transmitting members operable between a disengaged condition and an engaged condition in which relative rotation between said pair of members is retarded by frictional engagement between torque transmitting surfaces of said torque-transmitting members, one of said torque-transmitting members comprising base means adapted to be connected to one of said pair of members and having a circular outer wall extending around said friction disk means, and a body of elastomeric material extending around said friction disk means and having an outer surface portion secured to an inner surface of said circular wall and an inner surface portion secured to said friction disk means, said body of elastomeric material yieldably supporting said friction disk means for limited rotational movement relative to said base means upon operation of said torque-transmitting members to the engaged condition to thereby tend to minimize slippage upon initial engagement of said torque-transmitting members, and means mounted on said base means for effecting operation of said torque-transmitting members between the engaged and disengaged conditions.

11. An assembly as set forth in claim 10 wherein said means for effecting operation of said torque-transmitting members between the engaged and disengaged conditions includes an annular electrical coil, said base means further including a circular wall extending into a circular opening defined by said electrical coil and an end wall extending between said circular walls to thereby form an annular chamber for receiving said annular electrical coil.

12. An assembly as set forth in claim 10 wherein said friction disk means includes a friction disk and a backing plate secured to said friction disk, said body of elastomeric material being secured to said backing plate.

* * * * *